(12) United States Patent
Aperocho et al.

(10) Patent No.: US 6,536,917 B1
(45) Date of Patent: Mar. 25, 2003

(54) COMBINATION FLASHLIGHT AND TWO-WAY RADIO

(76) Inventors: Ray A. Aperocho, 451 S. Eddleman Ave., West Covina, CA (US) 91792; Jun D. Granflor, 1544 Dominguez Ranch Rd., Corona, CA (US) 92882

( * ) Notice: Subject to any disclaimer, the term of this patent is extended or adjusted under 35 U.S.C. 154(b) by 66 days.

(21) Appl. No.: 09/659,146

(22) Filed: Sep. 11, 2000

(51) Int. Cl.⁷ .............................................. F21V 33/00
(52) U.S. Cl. ..................... 362/253; 362/86; 362/183; 455/74; 455/344
(58) Field of Search .................. 362/86, 190, 234, 362/253, 183; 455/74, 344

(56) References Cited

U.S. PATENT DOCUMENTS

| | | | |
|---|---|---|---|
| 3,787,678 A | 1/1974 | Rainer | 240/10.6 CH |
| 4,045,663 A | 8/1977 | Young | 240/10.6 CH |
| 4,959,637 A | 9/1990 | Woods | 340/573 |
| 5,055,986 A | 10/1991 | Johnson | 362/253 |
| D381,100 S | 7/1997 | Fink | D26/38 |
| 5,839,821 A | 11/1998 | LeZotte | 362/253 |
| 6,050,694 A * | 4/2000 | Confrey | 362/253 |
| 6,315,425 B1 * | 11/2001 | Confrey | 362/190 |

* cited by examiner

*Primary Examiner*—Stephen Husar

(57) ABSTRACT

A flashlight having removable control section, a rechargeable main body and a battery charger. The control section has an antennae, a volume control knob and female receptacles for receiving male connectors. The main body has male connectors for electrical engagement with the female receptacles of the control section or the battery charger. The main body contains a rechargeable battery, a two way radio and a flashlight.

14 Claims, 2 Drawing Sheets

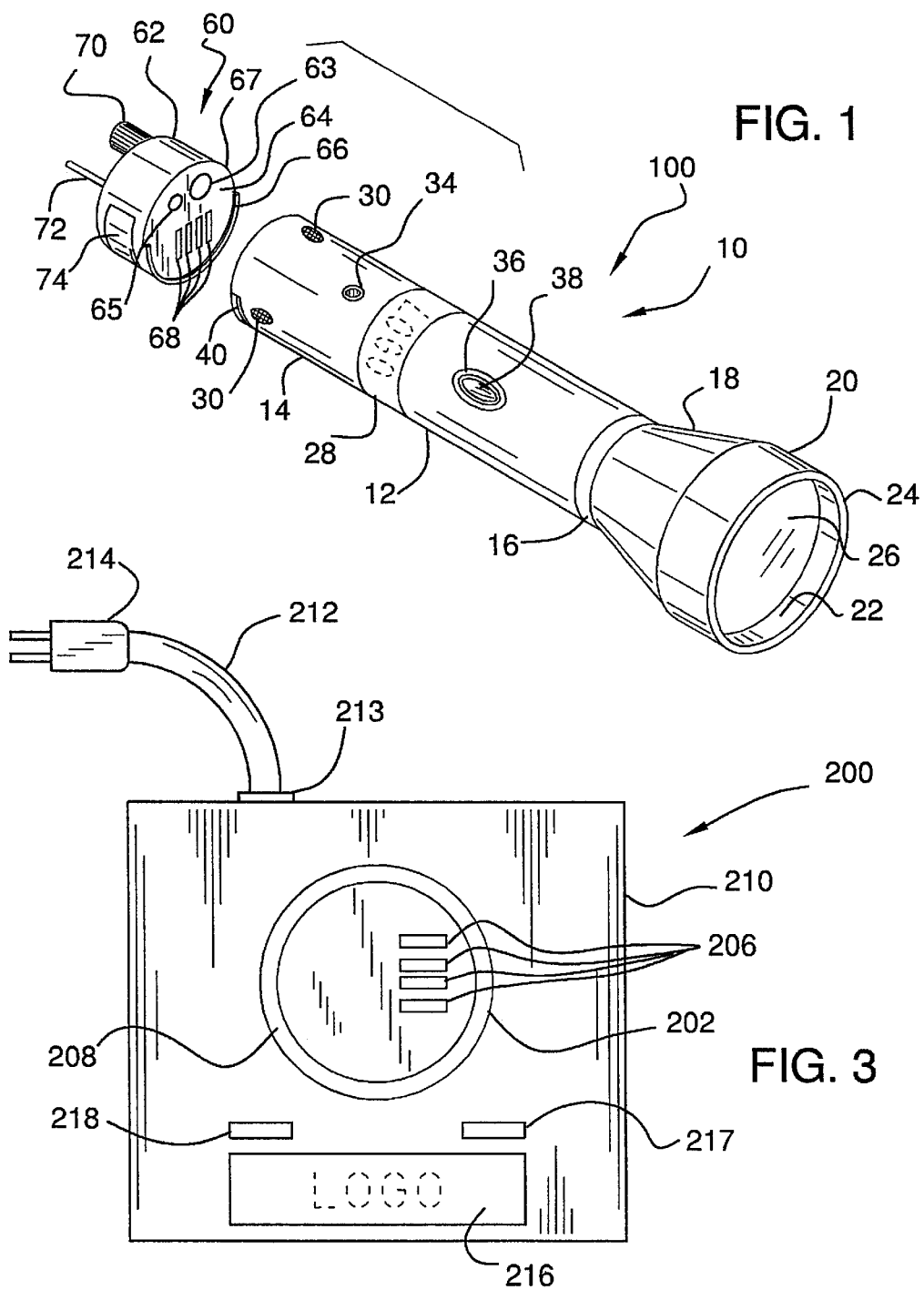

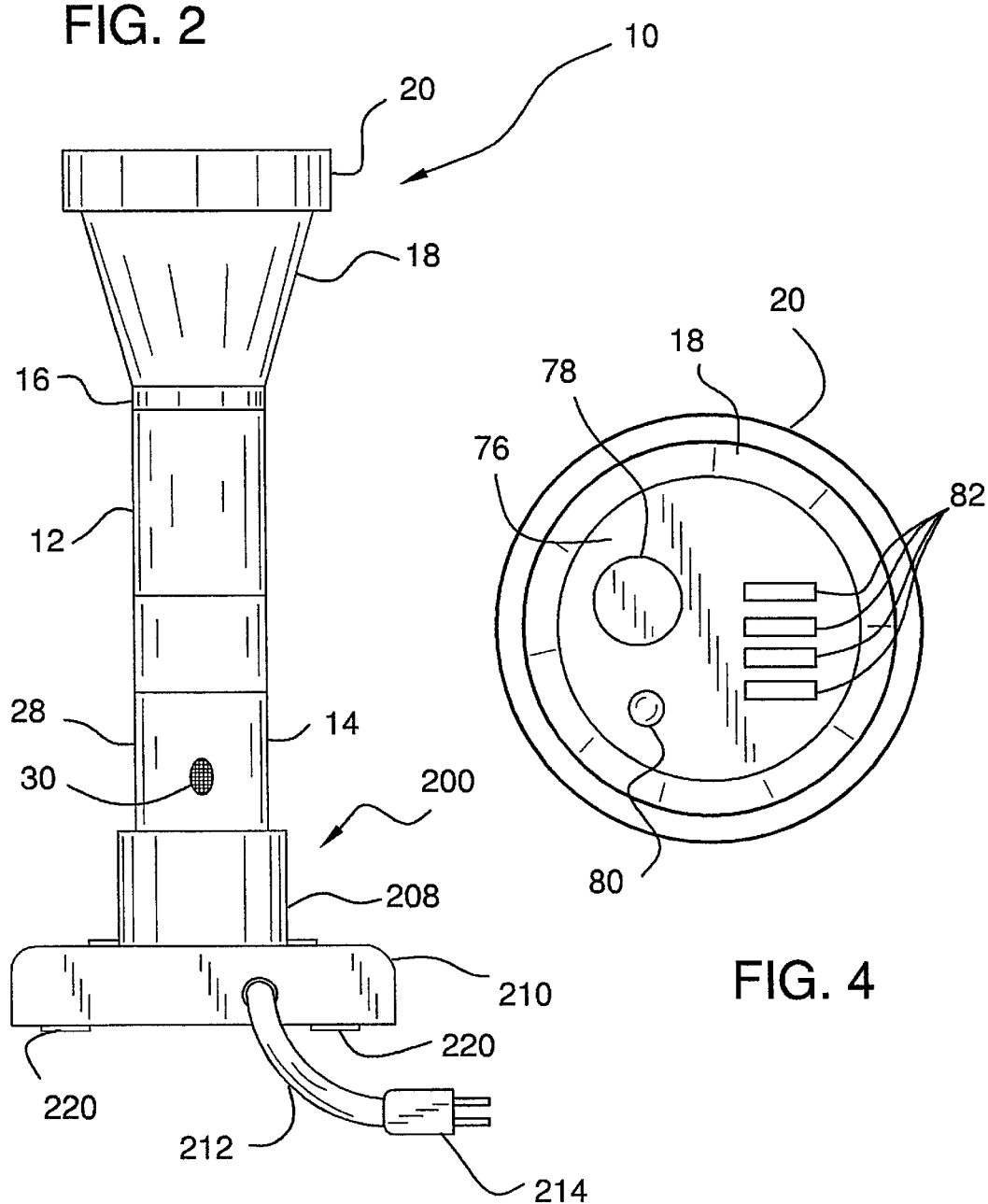

COMBINATION FLASHLIGHT AND TWO-WAY RADIO

BACKGROUND OF THE INVENTION

1. Field of the Invention

The present invention relates to an apparatus for combining a two way radio with a flashlight.

2. Description of the Prior Art

Emergency workers and police often need a flashlight to work in darkened areas. The flashlight takes up one hand and the other hand often has other equipment to hold. In order to communicate through a two way radio one hand must be free. A need exists to reduce the number of pieces of equipment that must be hand held. Combining a two way radio and a flashlight would allow both a light source and a communications device to be held in one hand.

U.S. Pat. No. 5,055,986 (the '986 patent) discloses a combination light, radio receiver, and clock in a housing for mounting on a wall or flat surface. The apparatus of the '986 patent may be powered by a cord connected to a wall socket or by a rechargeable batter. U.S. Pat. No. 4,045,663 discloses a rechargeable flashlight with two way wireless radio accessory. States Design Patent 381,100 discloses a combined flashlight, radio receiver and warning light. U.S. Pat. No. 4,959,637 discloses an emergency signaling device attached to a flashlight that emits a coded radio frequency alarm if the device detects no movement for a period of time. U.S. Pat. No. 3,787,678 discloses a rechargeable battery powered light.

What is needed beyond the prior art is a rechargeable, lightweight and compact flashlight and two way radio combination.

SUMMARY OF THE INVENTION

The invention which meets the needs identified above is a flashlight having removable control section, a rechargeable main body and a battery charger. The control section has an antennae, a volume control knob and female receptacles for receiving male connectors. The main body has male connectors for electrical engagement with the female receptacles of the control section or the battery charger. The main body contains a rechargeable battery, a two way radio and a flashlight.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a left side perspective view of the flashlight;

FIG. 2 is rear view of the battery charger with the main body of the flashlight engaged for recharging.

FIG. 3 is a top view of the battery charger.

FIG. 4 is a bottom view of the main body of the flashlight.

DESCRIPTION OF PREFERRED EMBODIMENTS

In FIG. 1, flashlight 100 is shown with control section 60 and main body 10. Control section 60 has volume control knob 70 and antennae 72 extending perpendicularly from control section outer face (not shown) of control section 60. Antennae 72 is flexible and fixed to control section 62 and electronically connected to antennae connector 65 for electronic engagement with main body 10. Volume control knob 70 is rotatably connected to control section 60 and electronically connected to volume control connector 63 for electronic engagement to main body 10. Volume control knob 70 also functions as an on/off switch. When turned counterclockwise, volume control knob 70 will stop at a first position which is the off position. When rotated clockwise, volume control knob 70 will rotate until stopping at a second position which is the maximum volume position. Between the first position and the second position, volume increases as the volume control knob 70 is rotated clockwise. Control section 60 has control section casing 62 that is cylindrical in shape and of the same diameter as main body 10. Control section casing 62 has manufacturer's identification plate 74 and control section interior face 64. Control section interior face 64 has volume control connector 63, antennae connector 65, and four control section battery plug receptacles 68. Control section 60 has interior face outer edge 64 that extends halfway around control section inner face 64 to meet inner face clip 66 which projects perpendicularly from control section inner face 64 for mating with main body 10.

Main body 10 has first section 14, first connecting section 28, second section 12, second connecting section 16, third section 18, lens housing 20 and lens 26. First section 14 has first section exterior face 76 (see FIG. 4) for physical and electrical engagement to control section 60 or to battery charger 200 (see FIG. 3). First section 14 has connecting clip receptacle 40 for physical engagement of inner face clip 66 of control section 60. First section 14 has a plurality of microphone/speakers 30. Two microphone/speakers 30 are shown in FIG. 1. One or more additional microphone/speakers 30 may be located on the other side of first section 14. In an alternate embodiment, one or more separate microphone and one or more separate speakers are located in first section 14 in place of combined microphone/speakers 30. Microphone/speakers are distributed so that at least one speaker will be uncovered when flashlight 100 is held by a user. First section 14 has earphone jack 34 for electrical engagement of an earphone (not shown). First section 14 contains rechargeable batteries. In the preferred embodiment, flashlight 100 is powered by rechargeable lithium-ion cells. First section 14 may be adapted for use of other commercially available rechargeable batteries.

First connecting section 28 is rotatably engaged to first section 14 so that first section 14 can be removed from main body 10. First section 14 contains rechargeable batteries that can be replaced by removing first section 14 from main body 10. First connecting section 14 may be imprinted with the logo of the company using flashlight 10. First section 14 is electrically connected to second section 12 by connecting wires (not shown) which are long enough to allow rotatable removal or engagement of first section 14 and second section 12 from first connecting section 28.

Second section 12 contains a two way radio which is electrically connected to microphone/speakers 30, to the rechargeable battery (not shown), to main body antennae connector 80 (see FIG. 4) and to main body volume knob connector (see FIG. 4) in first section 14. Second section 12 has button 38 for controlling the light and the two way radio. Backlight 36 is electrically connected to the rechargeable battery and surrounds button 38 so the button 38 may be easily seen in the dark. Alternatively, a second button could be added for controlling the two way radio and the first button would control the light only. In the preferred embodiment, one button controls both features because one button creates less distraction for the user.

Second connecting section 18 is rotatably engaged to second section 16 and to third section 18. Third section 18 is conical in shape and houses a standard flashlight bulb and reflective casing (not shown). The bulb is removably and electrically engaged in a bulb mount located within the reflective casing. The bulb mount is electrically connected to the rechargeable battery and to button 38. Lens housing 20 is rotatably connected to third section 18 and lens 26 is secured in a groove of lens housing 20 so that lens 26 is held between lens housing 20 and third section 18. Lens housing 18 projects outward perpendicular to lens 26 in offset section 22 and ends in lens housing outer edge 24.

In the preferred embodiment, control section 60, first section 14, first connecting section 28, second section 12, second connecting section 16, third section 18 and lens housing 20 are made of plastic or aluminum and are rubber coated.

FIG. 2 depicts main body 10 of flashlight 100 inserted into battery charger 200 for recharging. Battery charger 200 has receptacle 200 for receiving flashlight 100, base 210, cord 212 and plug 214. Control section 60 is removed from flashlight 100 so that first section 14 can electrically engage battery charger 200. FIG. 2 also shows the other side of Flashlight 100 which is not seen in FIG. 1. A third speaker/microphone 30 is located on first section 14 equidistant from the two speaker/microphones 30 shown in FIG. 1. Lens housing 20 extends beyond third section 18.

FIG. 3 shows a top view of battery charger 200. Plug 214 is suitable for electrical engagement with a wall socket (not shown). Cord 212 electrically connects plug 214 to battery charger 200. Cord 212 enters base 210 through port 213 and connects to the charging device contained therein. Receptacle 202 is fixedly engaged to base 210 and has receptacle top edge 208. Base 210 has base battery plug receptacles 206 for receiving battery plugs 82 (see FIG. 4) of first section 14 of flashlight 100. Red light 218 flashes when main body 10 is engaged to battery charger 200 and the batteries are insufficiently charged. Green light 217 turns on when the batteries are sufficiently charged. The logo of the business using flashlight 100 may be placed in logo receptacle 216 of base 210. Logo receptacle 216 is a slight rectangular indentation in the surface of base 210 for receiving adhesively backed printed matter which will fill logo receptacle 216 when positioned therein.

FIG. 4 is a bottom view of first section 14 of flashlight 100. Lens housing 20 and third section 18 can be seen extending beyond the rest of main body 10. First section exterior face 76 has main body volume connector 78, main body antennae connector 80 and battery plugs 82. When control section 60 is mated to main body 10, main body volume connector 78 mates with control section volume connector 63 and main body antennae connector 80 mates with control section antennae connector 65. Battery plugs 82 engage base battery plug receptacles 206 of battery charger 200 when charging and control section battery plug receptacles 68 when control section 60 is attached to main body 10 of flashlight 100.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:
1. A flashlight comprising:

a control section; and a main body physically and electrically engaged to said control section, said main body having a rechargeable battery, a two-way radio and a flashlight.

2. The control section of claim 1 further comprising:

a control section casing having an exterior face and an interior face;

an antennae fixedly connected to said exterior face and electrically connected to an antennae connector in the interior face;

a volume control knob rotatably connected to said exterior face and electrically connected to a volume control connector in the interior face; and a plurality of battery plug receptacles.

3. The main body of claim 1 further comprising:

a first section comprising;
    a first section exterior face containing an antennae connector, a volume knob connector and a plurality of battery plugs;
    a rechargeable battery;
    a plurality of microphone/speakers;

a first connecting section;

a second section containing a two-way radio;

a second connecting section;

a third section comprising;
    a reflector assembly and bulb mount electrically connected to said rechargeable battery; a bulb;

a lens housing section; and a lens.

4. The main body of claim 1 further comprising:

a button; and a backlight.

5. The main body of claim 1 further comprising a plurality of microphone/speakers located so that at least one microphone/speaker will be uncovered when the flashlight is held by a user.

6. The main body of claim 1 further comprising a battery charger having a receptacle for receiving the main body.

7. The apparatus of claim 1 further comprising a button for controlling the two-way radio, wherein the button is backlit.

8. A flashlight comprising:

a control section comprising;
    a control section casing having an exterior face and an interior face;
    an antennae fixedly connected to said exterior face and electrically connected to an antennae connector in the interior face;
    a volume control knob rotatably connected to said exterior face and electrically connected to a volume control connector in the interior face;
    a plurality of battery plug receptacles;

a main body physically and electrically engaged to said control section, said main body comprising;
    a first section comprising;
        a first section exterior face containing an antennae connector, a volume knob connector and a plurality of battery plugs;
        a rechargeable battery;
        a plurality of microphone/speakers;

a first connecting section;
a second section containing a two-way radio;
a second connecting section;
a third section comprising;
　a reflector casing;
　a bulb mount removably engaged in said reflector casing and electrically connected to said rechargeable battery;
　a bulb removably engaged in said bulb mount;
a lens housing section; and
a lens.

9. The main body of claim 8 further comprising a connector clip receptacle.

10. The control section of claim 8 further comprising a connecting clip.

11. The apparatus of claim 4 further comprising a button for controlling the two-way radio, wherein the button is backlit.

12. An apparatus comprising:
a flashlight section containing a bulb and a reflector;
a battery disposed within said flashlight section;
a two-way radio section detachable from said flashlight section; and
a button for controlling the two-way radio section, wherein said button is backlit.

13. An apparatus comprising:
means for generating light;
a battery disposed within said means for generating light;
means for communicating removably attached to said means for generating light; and
means for recharging a battery disposed to accept said battery.

14. The apparatus of claim 12 further comprising a button for controlling the means for communicating, wherein the button is backlit.

* * * * *